United States Patent
Zink et al.

(10) Patent No.: US 10,442,293 B2
(45) Date of Patent: Oct. 15, 2019

(54) VEHICLE DRIVELINE COMPONENT HAVING AN ACTUATION SYSTEM FOR DRIVELINE DISCONNECT

(71) Applicant: AMERICAN AXLE & MANUFACTURING, INC., Detroit, MI (US)

(72) Inventors: Frederick E. Zink, Capac, MI (US); Brian A. Calomeni, Shelby Township, MI (US); Peyman Moradshahi, Rochester Hills, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 179 days.

(21) Appl. No.: 15/553,449

(22) PCT Filed: Feb. 24, 2016

(86) PCT No.: PCT/US2016/019233
§ 371 (c)(1),
(2) Date: Aug. 24, 2017

(87) PCT Pub. No.: WO2016/138065
PCT Pub. Date: Sep. 1, 2016

(65) Prior Publication Data
US 2018/0015824 A1   Jan. 18, 2018

Related U.S. Application Data

(60) Provisional application No. 62/119,831, filed on Feb. 24, 2015.

(51) Int. Cl.
*B60K 23/08* (2006.01)
*B60K 17/02* (2006.01)

(52) U.S. Cl.
CPC .......... *B60K 23/0808* (2013.01); *B60K 17/02* (2013.01); *B60K 23/08* (2013.01); *B60K 2023/0833* (2013.01); *B60Y 2400/421* (2013.01)

(58) Field of Classification Search
CPC .... B60K 23/0808; B60K 17/02; B60K 23/08; B60K 2023/0833; B60Y 2400/241
See application file for complete search history.

(56) References Cited

U.S. PATENT DOCUMENTS

| 745,763 A | 12/1903 | Barlow |
| 2,783,861 A * | 3/1957 | Jungles .................. F16D 59/00 188/134 |

(Continued)

FOREIGN PATENT DOCUMENTS

| EP | 0086999 A1 | 8/1983 |
| JP | S64-046045 A | 2/1989 |

(Continued)

OTHER PUBLICATIONS

International Search Report and Written Opinion of the ISA for PCT/US2016/019233, ISA/KR, Daejeon, dated May 23, 2016.

(Continued)

*Primary Examiner* — Tinh T Dang
(74) *Attorney, Agent, or Firm* — Harness, Dickey & Pierce, P.L.C.

(57) ABSTRACT

A vehicle driveline component with an actuator and a rotary coupling. The actuator has an actuator housing, a motor, a transmission, a first cam, a second cam, and a first biasing spring. The motor is coupled to the actuator housing and includes a motor output member. The transmission has a transmission input member, which is driven by the motor output member, and a transmission output member. The first (Continued)

cam is housed in the actuator housing and is coupled to the transmission output member for rotation therewith. The first cam has a first set of cam features that are disposed about a first annular surface. The second cam has a cam body, which is received in the first cam, and a second set of cam features that are disposed about a second annular surface. The second set of cam features abut the first set of cam features. Rotation of the first cam relative to the second cam into a first position orients the first set of cam features onto the second set of cam features so as to position the second cam in an extended position relative to the first cam. Rotation of the first cam relative to the second cam into a second position orients the first set of cam features onto the second set of cam features so as to position the second cam in a retracted position relative to the first cam. The first biasing spring is disposed between the first and second cams and biases the second cam toward the retracted position. The rotary coupling has a first coupling member, a second coupling member and a second biasing spring. The first coupling member is rotatably and axially slidably received in the second cam. The first coupling member is axially movable between a first coupling position, in which the first coupling member is decoupled from the second coupling member, and a second coupling position in which the first coupling member is coupled to the second coupling member to permit the transmission of rotary power through the rotary coupling. The second biasing spring is disposed between the first coupling member and the second cam.

7 Claims, 10 Drawing Sheets (56) References Cited

U.S. PATENT DOCUMENTS

| | | | |
|---|---|---|---|
| 3,217,847 A | 11/1965 | Petrak | |
| 3,433,337 A | 3/1969 | Salter | |
| 3,753,479 A | 8/1973 | Williams | |
| 4,103,873 A * | 8/1978 | Sato | B66D 1/58 |
| | | | 188/181 T |
| 4,579,201 A * | 4/1986 | Tiedeman | B64C 13/28 |
| | | | 188/134 |
| 4,696,382 A | 9/1987 | Aho | |
| 4,776,441 A | 10/1988 | Kagata et al. | |
| 4,853,629 A | 8/1989 | Rops | |
| 5,261,646 A * | 11/1993 | Telford | B66D 5/08 |
| | | | 188/343 |
| 5,334,096 A | 8/1994 | Iwao | |
| 5,743,143 A | 4/1998 | Carpenter et al. | |
| 5,867,092 A | 2/1999 | Vogt | |
| 5,890,986 A | 4/1999 | Pritchard et al. | |
| 6,230,577 B1 | 5/2001 | Showalter et al. | |
| 6,382,040 B1 | 5/2002 | Diangelo et al. | |
| 6,619,153 B2 | 9/2003 | Smith et al. | |
| 7,399,251 B2 | 7/2008 | Mueller et al. | |
| 7,694,598 B2 | 4/2010 | Kriebernegg et al. | |
| 7,717,437 B2 | 5/2010 | Adams, III et al. | |
| 8,037,779 B2 | 10/2011 | Shiozaki et al. | |
| 8,156,837 B2 | 4/2012 | Smith | |
| 8,258,779 B2 | 9/2012 | Wenzel et al. | |
| 8,443,954 B2 | 5/2013 | Quehenberger et al. | |
| 8,597,150 B1 | 12/2013 | Downs et al. | |
| 8,726,749 B2 | 5/2014 | Hirsch et al. | |
| 9,005,069 B2 | 4/2015 | Fusegi et al. | |
| 9,151,368 B2 | 10/2015 | Downs et al. | |
| 9,182,012 B2 | 11/2015 | Greiss et al. | |
| 9,341,238 B2 | 5/2016 | Peura et al. | |
| 9,371,869 B2 | 6/2016 | Fukuda et al. | |
| 9,546,696 B2 | 1/2017 | Oram et al. | |
| 10,041,590 B2 * | 8/2018 | Maki | F16H 61/68 |
| 2002/0125094 A1 | 9/2002 | Zimmermann et al. | |
| 2006/0054373 A1 | 3/2006 | Mueller | |
| 2008/0210034 A1 | 9/2008 | Murakami et al. | |
| 2011/0100144 A1 | 5/2011 | Neelakantan et al. | |
| 2011/0152026 A1 | 6/2011 | Williams | |
| 2012/0017716 A1 | 1/2012 | Neelakantan et al. | |
| 2013/0019705 A1 | 1/2013 | Pregnolato et al. | |
| 2013/0310209 A1 | 11/2013 | Downs et al. | |
| 2015/0053027 A1 | 2/2015 | Downs | |
| 2015/0316110 A1 | 11/2015 | Oram et al. | |
| 2015/0321554 A1 | 11/2015 | Oram et al. | |
| 2016/0061274 A1 | 3/2016 | Engerer et al. | |
| 2016/0243937 A1 | 8/2016 | Peura et al. | |
| 2016/0333954 A1 | 11/2016 | Lindberg et al. | |
| 2017/0241486 A1 * | 8/2017 | Pritchard | B60K 17/02 |
| 2018/0135751 A1 * | 5/2018 | Maki | F16D 21/00 |

FOREIGN PATENT DOCUMENTS

| | | |
|---|---|---|
| JP | H05-118440 A | 5/1993 |
| JP | 2007-232184 A | 9/2007 |

OTHER PUBLICATIONS

International Search Report and Written Opinion of the ISA for PCT/US2016/028831, ISA/KR, Daejeon, dated Jul. 27, 2016.

\* cited by examiner

VEHICLE DRIVELINE COMPONENT HAVING AN ACTUATION SYSTEM FOR DRIVELINE DISCONNECT

CROSS-REFERENCE TO RELATED APPLICATION

This application is a U.S. National Phase Application under 35 U.S.C. 371 of International Application No. PCT/US2016/019233 filed on Feb. 24, 2016 and published in English as WO 2016/138065 A1 on Sep. 1, 2016. This application claims the benefit of U.S. Provisional Application No. 62/119,831, filed on Feb. 24, 2015. The disclosure of each of the above-identified applications is incorporated by reference as if set forth in their entirety herein.

FIELD

The present disclosure relates to a vehicle driveline component having an actuation system for driveline disconnect.

BACKGROUND

This section provides background information related to the present disclosure which is not necessarily prior art.

A vehicle having an all-wheel drive driveline that with a permanently driven axle (e.g., front axle) and a secondary axle (e.g., rear axle) that can be selectively disconnected is disclosed in commonly assigned U.S. Pat. No. 8,042,642. The driveline of the '642 patent employs a disconnect mechanism in a power take-off unit (PTU) having an actuation system that includes a fork for moving an axially shiftable element. While this configuration is suited for its intended purpose, there remains a need in the art for a disconnectable all-wheel drive driveline having a disconnect mechanism with an improved actuation system.

SUMMARY

In one form, the present teachings provide a vehicle driveline component having an actuator and a rotary coupling. The actuator has an actuator housing, a motor, a transmission, a first cam, a second cam, and a first biasing spring. The motor is coupled to the actuator housing and includes a motor output member. The transmission has a transmission input member, which is driven by the motor output member, and a transmission output member. The first cam is housed in the actuator housing and is coupled to the transmission output member for rotation therewith. The first cam has a first set of cam features that are disposed about a first annular surface. The second cam has a cam body, which is received in the first cam, and a second set of cam features that are disposed about a second annular surface. The second set of cam features abut the first set of cam features. Rotation of the first cam relative to the second cam into a first position orients the first set of cam features onto the second set of cam features so as to position the second cam in an extended position relative to the first cam. Rotation of the first cam relative to the second cam into a second position orients the first set of cam features onto the second set of cam features so as to position the second cam in a retracted position relative to the first cam. The first biasing spring is disposed between the first and second cams and biases the second cam toward the retracted position. The rotary coupling has a first coupling member, a second coupling member and a second biasing spring. The first coupling member is rotatably and axially slidably received in the second cam. The first coupling member is axially movable between a first coupling position, in which the first coupling member is decoupled from the second coupling member, and a second coupling position in which the first coupling member is coupled to the second coupling member to permit the transmission of rotary power through the rotary coupling. The second biasing spring is disposed between the first coupling member and the second cam.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
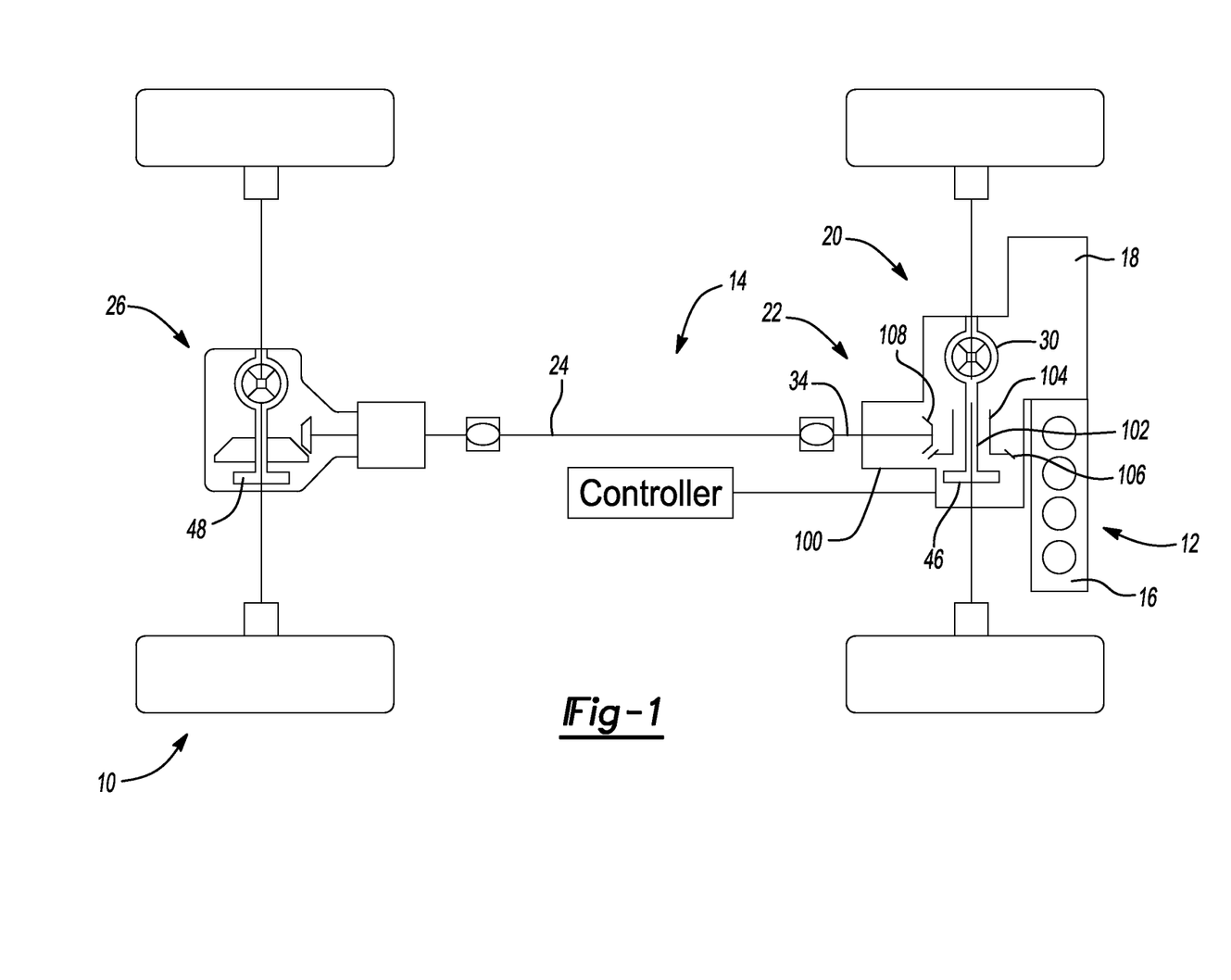
FIG. 1 is a schematic illustration of an exemplary vehicle having a disconnecting all-wheel drive driveline with an actuation system constructed in accordance with the teachings of the present disclosure.

With reference to FIG. 1 of the drawings, an exemplary vehicle having an actuator for a disconnecting driveline constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14.

The transmission 18 can have a plurality of automatically or manually-selected gear ratios.

The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 14 can include a front drive module 20, a power take-off unit (PTU) 22, a propshaft 24 and a rear drive module 26.

The front drive module 20 can be configured in any desired manner, such as a front beam axle or an independent front drive axle. An output of the transmission 18 can be coupled to an input of the front axle assembly 20 to drive an input member of the front axle assembly 20. In the particular example provided, the front drive module 20 includes a front differential assembly and the output of the transmission 18 drives a front differential case 30 of the front differential assembly. The PTU 22 can receive rotary power from the input member 30 of the front drive module 20 and can selectively transmit rotary power to a PTU output member 34. The PTU output member 34 can transmit rotary power to the prop shaft 24, which can couple the PTU output member 34 to the rear drive module 26 such that rotary power output by the PTU 22 is received by the rear drive module 26.

The rear drive module 26 can be configured in any desired manner, such as a rear beam axle, an independent rear drive axle, or a rear drive module. The front drive module 20 can be driven on a full-time basis while the rear drive module 26 can be driven on a part-time basis. As such, the drive train 14 can include one or more clutches to interrupt the transmission of rotary power through a part of the drive train 14. In the particular example provided, the drive train 14 includes a first actuation system or clutch 46, which can be configured to interrupt the transmission of rotary power through the PTU 22, and a second clutch 48, which can be configured to halt rotation of components within the rear drive module 26.

Figure 2:
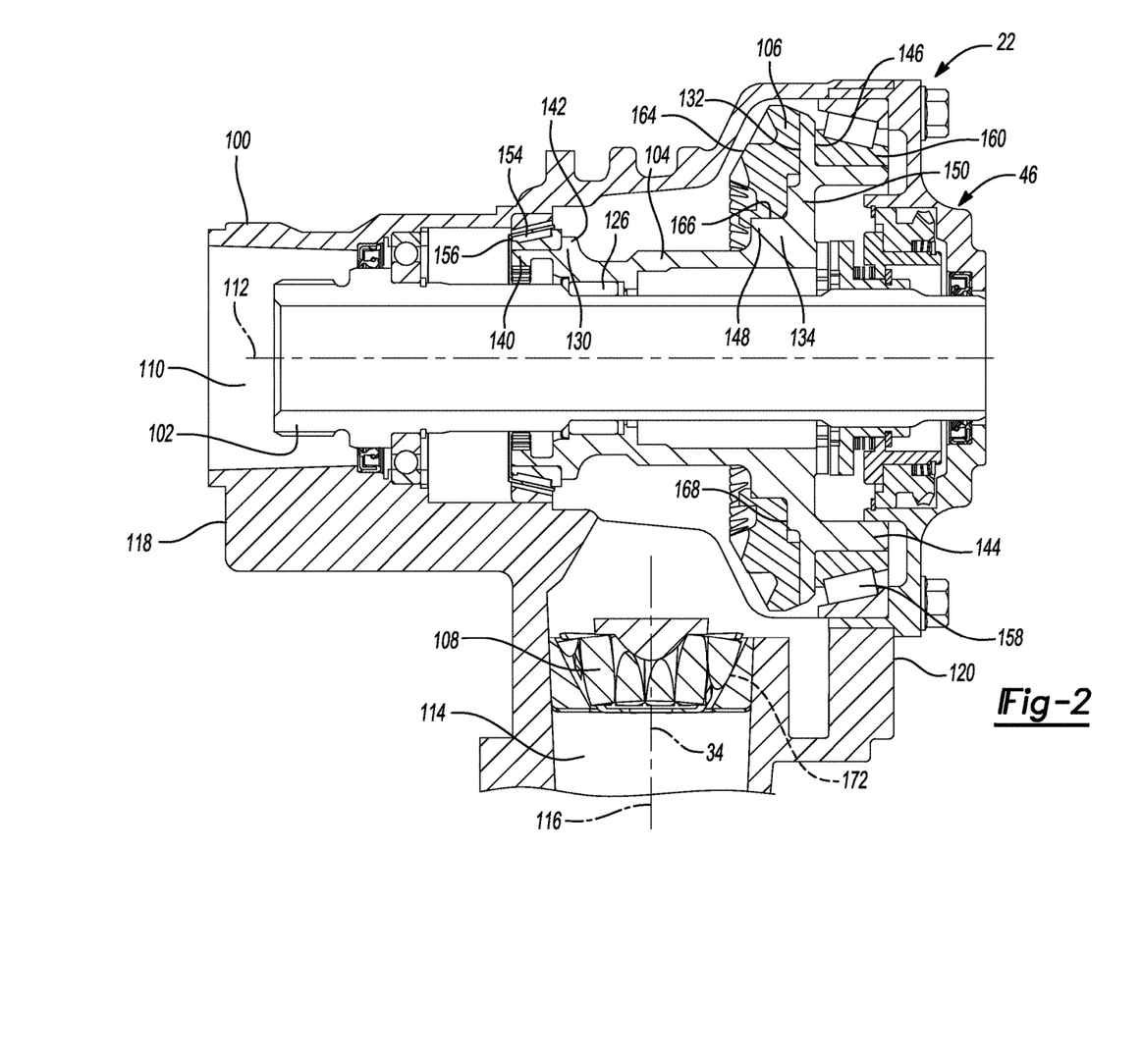
FIG. 2 is a section view taken longitudinally through a portion of the all-wheel drive driveline that is depicted in FIG. 1, the view illustrating a power take-off unit (PTU) and the actuation system in more detail.

With reference to FIG. 2, the PTU 22 can include a PTU housing 100, an input spindle 102, an intermediate spindle 104, a ring gear 106, a pinion 108, the PTU output member 34 and the first clutch 46.

The PTU housing 100 can define a first cavity 110, which can be disposed along a first axis 112, and a second cavity 114 that can be disposed along a second axis 116 that can be transverse to the first axis 112. The first cavity 110 can be configured to receive the input spindle 102, the intermediate spindle 104, the ring gear 106 and the pinion 108. The second cavity 114 that can intersect the first cavity 110 and can be configured to receive the pinion 108 and the PTU output member 34. The PTU housing 100 can have a first lateral end 118, which is configured to be coupled to a housing (not shown) that is configured to house the front differential assembly (not shown), and a second end 120 that is open.

The input spindle 102 can be a hollow, sleeve-like structure that can be received in the first cavity 110 and can be mounted in the PTU housing 100 for rotation about the first axis 112. A stub shaft (not shown), which is configured to transmit rotary power between a first output (not shown) of the front differential assembly (not shown) and an associated one of the front wheels (not shown), can be received within the input spindle 102.

The intermediate spindle 104 can be a hollow structure that can be disposed concentrically about the input spindle 102. If desired, a bearing, such as a needle bearing 126, can be received between the input spindle 102 and the intermediate spindle 104. The intermediate spindle 104 can define a first shoulder 130, a second shoulder 132 and a third shoulder 134. The first shoulder 130 can be disposed on a first axial end of the intermediate spindle 104 and can define a first annular bearing mount 140 and a first shoulder wall 142. Similarly, the second shoulder 132 can be disposed on a second, opposite axial end of the intermediate spindle 104 and can define a second annular bearing mount 144 and a second shoulder wall 146. The third shoulder 134 can be disposed axially between the first and second shoulders 130 and 132 and can define an annular gear mount 148 and a third shoulder wall 150.

A first bearing 154 can be mounted on the first shoulder 130 and can support the first axial end of the intermediate spindle 104 for rotation relative to the PTU housing 100. In the particular example provided, the first bearing 154 is a tapered roller bearing having a first inner bearing race 156 that is engaged to the first annular bearing mount 140 and abutted against the first shoulder wall 142.

A second bearing 158 can be mounted on the second shoulder 132 and can support the opposite axial end of the intermediate spindle 104 for rotation relative to the PTU housing 100. In the example provided, the second bearing 158 is a tapered roller bearing having a second inner bearing race 160 that is engaged to the second annular bearing mount 144 and abutted against the second shoulder wall 146. In the example provided, the diameter of the second annular bearing mount 144 is significantly larger than the diameter of the first annular bearing mount 140 so as to provide a space for housing the first clutch 46 that is radially inward of the second bearing 158. In this regard, the larger diameter second bearing 158 permits the provision of a space, which is radially inward along a plane taken perpendicular to the first axis 112, into which at least a portion of the first clutch 46 can be received.

The ring gear 106 can have a plurality of ring gear teeth 164 and can define a ring gear bore 166 and a ring gear shoulder 168. The ring gear 106 can be received onto the intermediate spindle 104 such that the surface of the ring gear bore 166 is engaged to the annular gear mount 148 and the ring gear shoulder 168 is abutted against the third shoulder wall 150. Any desired coupling means, such as threaded fasteners, a toothed connection, an interference fit, and/or one or more welds, can be employed to fixedly couple the ring gear 106 to the intermediate spindle 104 such that the ring gear 106 is rotatable with the intermediate spindle about the first axis 112.

The pinion 108 can be received in the second cavity 114 and can be disposed for rotation about the second axis 116. The pinion 108 can include pinion teeth 172 that can be meshingly engaged to the ring gear teeth 164. The pinion 108 and the ring gear 106 can be any type of bevel gear arrangement, such as a spiral bevel gear arrangement, and moreover, the first and second axes 112 and 116 can be arranged to intersect one another, or could be offset from one another so that the pinion 108 and the ring gear 106 form a hypoid gear set.

The PTU output member 34 can be fixedly coupled the pinion 108 such that the PTU output member 34 rotates with the pinion 108 about the second axis 116. The PTU output member 34 is configured to be coupled via the propshaft 24 (FIG. 1) to the rear drive module 26 (FIG. 1).

Figure 3:
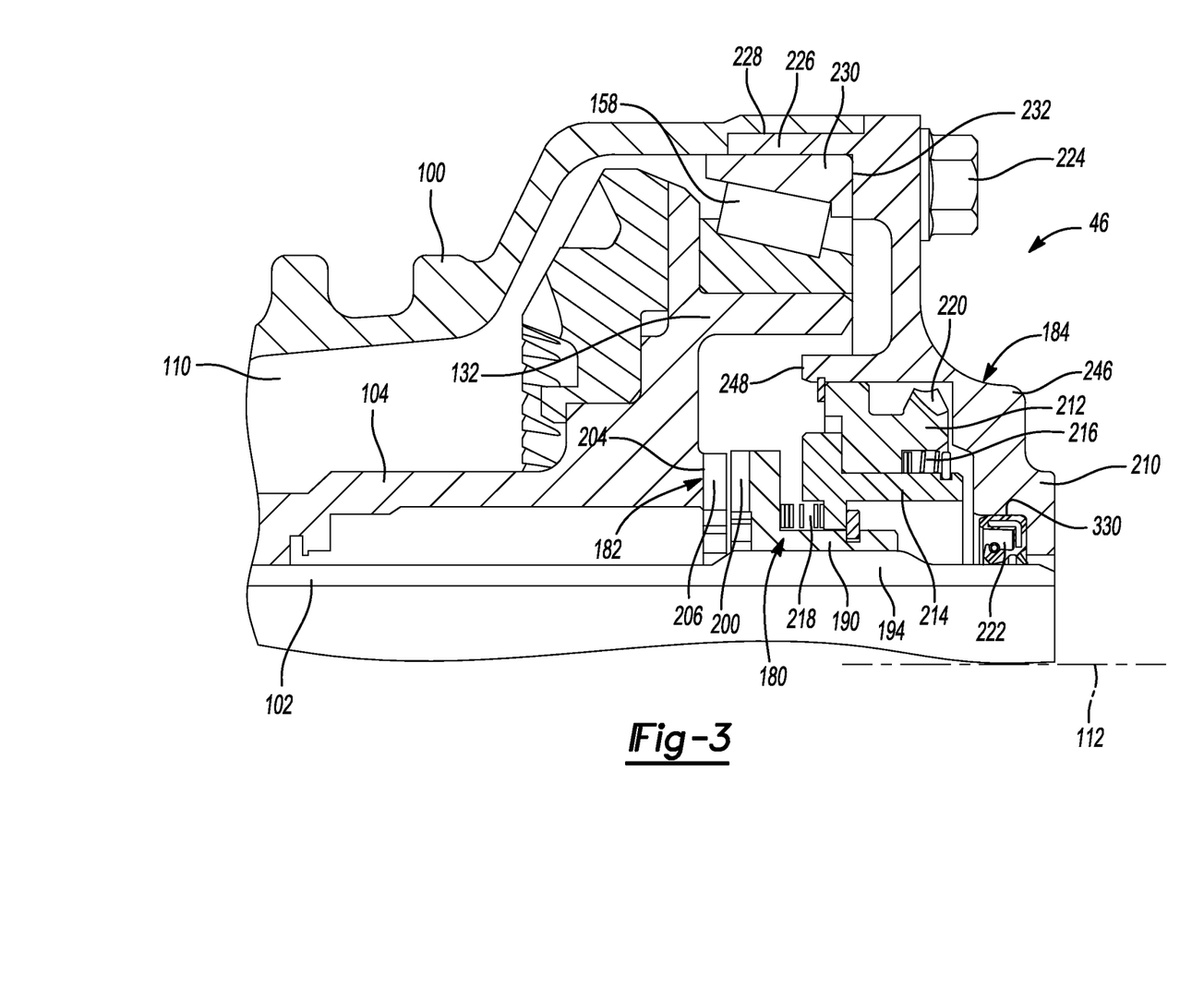
FIG. 3 is an enlarged portion of FIG. 2.
Figure 4:
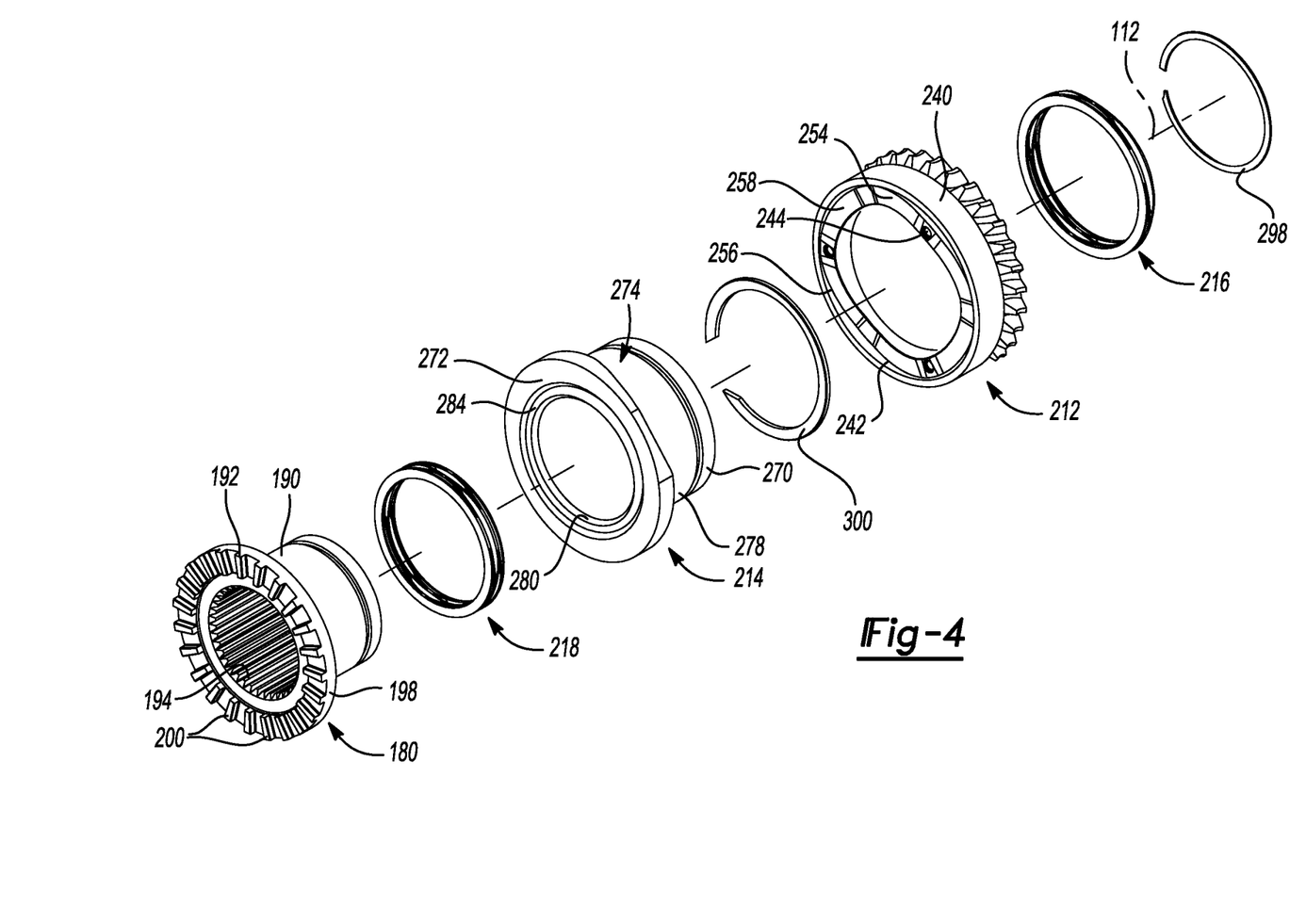
FIG. 4 is an exploded perspective view of a portion of the actuation system.

With reference to FIGS. 3 and 4, the first clutch 46 can be configured as a dog clutch mechanism and can include a first dog 180, a second dog 182 and an actuator 184. The first dog 180 can include a drive member 190, which can have a hollow, tubular shape, and a first dog structure 192 that can be formed as a flange that can be fixedly coupled to the drive member 190 and extend radially outwardly therefrom. The drive member 190 is configured to axially slidably but non-rotatably engage the input spindle 102. In the particular example provided, the input spindle 102 includes an output portion 194 having a plurality of external spline teeth formed thereon, while the drive member 190 is disposed coaxially about the input spindle 102 and has a plurality of internal spline teeth 198 that are slidably but non-rotatably engaged to the external spline teeth on the input spindle 102. The first dog structure 192 can include a first annular body 198 and a plurality of first face gear teeth 200 that can be formed on an axial face of the first annular body 198. The first face gear teeth 200 can be spaced circumferentially apart from one another around the first annular body 198.

The second dog 182 can comprise a second annular body 204 and a plurality of second face gear teeth 206 that can be formed on an axial face of the second annular body 204. The second face gear teeth 206 can be spaced circumferentially apart from one another around the second annular body 204. The second dog 182 can be fixedly coupled to the intermediate spindle 104 and can be disposed in a space that can be radially inwardly of the second shoulder 132. In the example provided, the second dog 182 is integrally formed with the intermediate spindle 104, but it will be appreciated that the second dog 182 could be a discrete component that could be assembled to the intermediate spindle 104.

The actuator 184 can comprise an actuator housing 210, a first cam 212, a second cam 214, a first biasing spring 216, a second biasing spring 218, a drive mechanism 220 and a seal 222. The actuator housing 210 can be configured to support the drive mechanism 220, the first dog 180 and the first and second biasing springs 216 and 218 and can be configured to close the open end of the PTU housing 100. The actuator housing 210 can be coupled to the PTU housing 100 with a plurality of threaded fasteners 224. The actuator housing 210 can include an annular lip 226 that can be received into a bore 228 that is formed in the PTU housing 100. The annular lip 226 and the bore 228 can cooperate to precisely align the actuator housing 210 to the first axis 112. An outer bearing race 230 of the second bearing 158 can be received within the annular lip 226 and can be abutted against an axial face 232 of the actuator housing 210. If desired, one or more shims (not shown) can be received between the outer bearing race 230 and the axial face 232 of the actuator housing 210; the shim(s) can be selected so that the first bearing 154 (FIG. 2) and the second bearing 158 are preloaded to a desired degree when the actuator housing 210 is fixedly coupled to the PTU housing 100. It will be appreciated that one or more gaskets or seals (not shown) can be employed to seal the interface between the PTU housing 100 and the actuator housing 210. For example, an O-ring seal (not shown) could be mounted to the annular lip 226 and can sealingly engage the inside surface of the bore 228.

Figure 5:
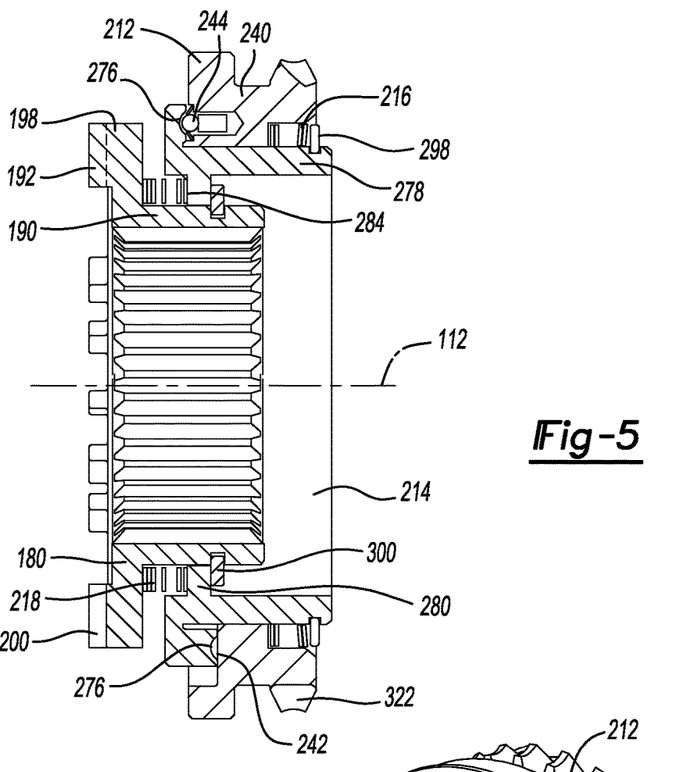
FIG. 5 is a perspective view of a portion of the actuation system illustrating a first dog and a first cam.
Figure 6:
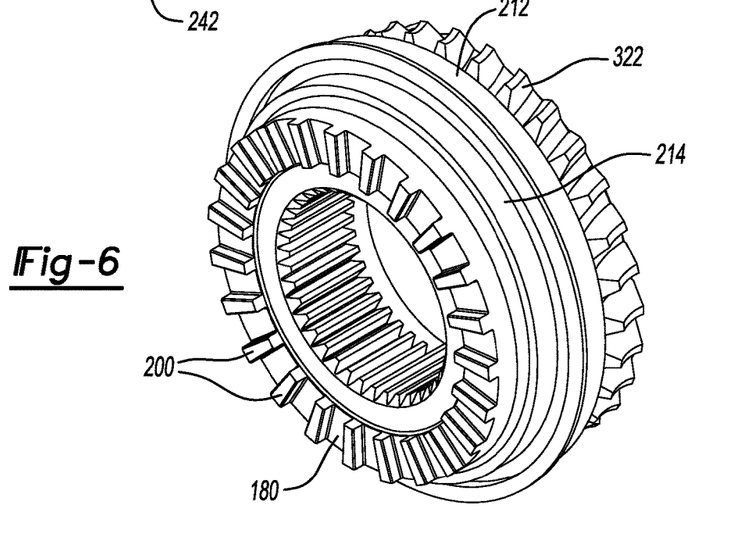
FIG. 6 is a longitudinal section view taken through a portion of the actuation system.

With reference to FIGS. 4 through 7, the first cam 212 can be rotatable about the first axis 112 and can include a first cam body 240, a first cam profile 242 and one or more detent members 244. The first cam body 240 can be an annular structure that can be disposed concentrically about the first axis 112 and received in an annular pocket 246 (FIG. 3) that is formed in the actuator housing 210 (FIG. 3). An internal snap ring 248 (FIG. 3), which can be fitted into a groove in the actuator housing 210 (FIG. 3), can be employed to limit movement of the first cam 212 along the first axis 112 in a direction away from the actuator housing 210 (FIG. 3). The first cam profile 242 can be fixedly coupled to the first cam body 240 and can define one or more circumferentially extending first cam sections 252. In the example provided, the first cam profile 242 defines three identical first cam sections 252, each of which defining a first valley 254, a first peak 256 and a first ramp section 258 that extends between and interconnects the first peak 256 and the first valley 254. Each of the detent members 244 can be mounted so as to extend in a resilient manner from the first cam profile 242 in a desired area, such as on an associated one of the first peaks 256. It will be appreciated that the detent members 244 can be mounted in a sleeve and a spring could be employed to bias the detent member 244 outwardly from the sleeve as shown in FIG. 5.

Figures 7, 8:
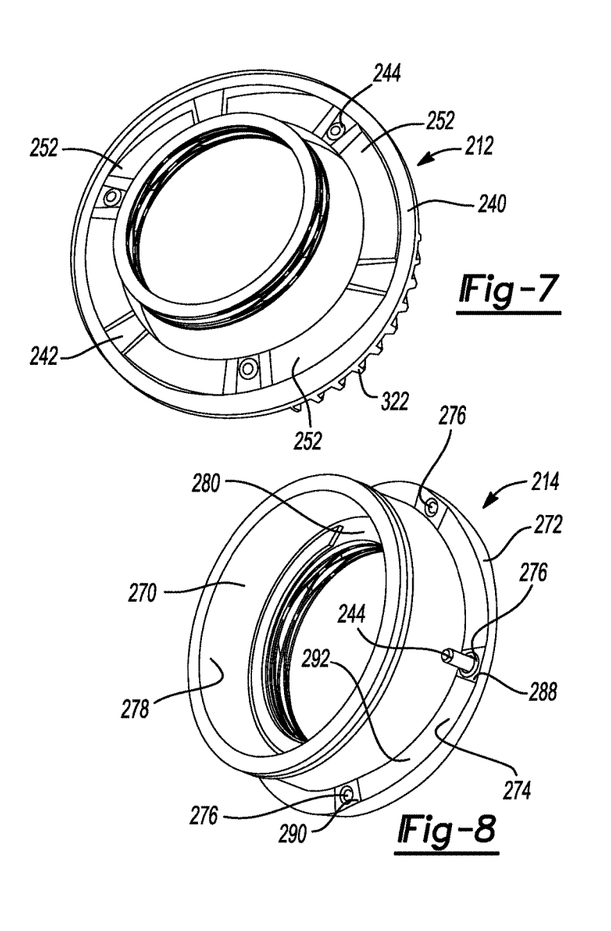
FIG. 7 is a perspective view of a portion of the actuation system depicting the first cam in more detail.
FIG. 8 is a perspective view of a portion of the actuation system depicting a second cam.

With reference to FIGS. 4, 5 and 8, the second cam 214 can have a second cam body 270, an output flange 272, a second cam profile 274 and one or more detent recesses 276. The second cam body 270 can include a sleeve-like structure 278, which can be received coaxially between the first cam body 240 and the drive member 190 of the first dog 180, and a centering member 280 that can engage the drive member 190 to maintain the second cam 214 in a position that is concentric with the drive member 190. The output flange 272 can be fixedly coupled to an end of the second cam body 270 and can extend radially outwardly therefrom. The output flange 272 can define a thrust surface 284 that can face the first dog structure 192. In the example provided, a counterbore is formed into the output flange 272 and defines the thrust surface 284. The second cam profile 274 can be coupled to or formed on an axial side of the output flange 272 that faces the first cam profile 242. The second cam profile 274 can define one or more second cam segments, each of which having a second valley 288, a second peak 290 and a second ramp section 292 that extends between and interconnects the second peak 290 and the second valley 288. Each of the detent recesses 276 can be formed or located on the second cam 214 so as to engage a corresponding one of the detent members 244 when the first cam 212 is oriented in a predetermined radial orientation relative to the second cam 214. In the example provided, a first set of the detent recesses 276 are formed into the second peaks 290 and a second set of the detent recesses 276 are formed into the second valleys 288. The detent members 244 carried by the first cam 212 will engage the detent recesses 276 of the first set of detent recesses to resist relative rotation between the first and second cams 212 and 214 when the first peaks 256 are aligned to the second peaks 290. Additionally, the detent members 244 carried by the first cam 212 will engage the detent recesses 276 of the second set of detent recesses to resist relative rotation between the first and second cams 212 and 214 when the first peaks 256 are aligned to the second valleys 288.

In FIGS. 4 and 5, the first biasing spring 216 can be mounted on the sleeve-like structure 278 between an axial face on the first cam 212 and an external snap ring 298 that is mounted in a groove that is formed into the sleeve-like structure 278. The axial face on the first cam 212 can be defined by a counterbore that can be formed into an axial end of the first cam 212 on a side that is opposite the first cam profile 242. The first biasing spring 216 can be any type of spring, such as a wave spring. The first biasing spring 216 can be configured to urge the second cam 214 along the first axis 112 in a direction toward the first cam 212.

The second biasing spring 218 can be mounted on the drive member 190 and disposed axially between the first annular body 198 on the first dog structure 192 and the thrust surface 284 on the second cam 214. If desired, a thrust bearing (not shown), can be employed between the second biasing spring 218 and the first annular body 198 on the first dog structure 192. The second biasing spring 218 can be any type of spring, such as a wave spring, and can be configured to urge the first dog 180 along the first axis 112 in a direction away from the second cam 214. An external snap ring 300 can be fitted to a groove 302 in the drive member 190 and contact between the centering member 280 on the second cam 214. The external snap ring 300 can limit the amount by which the second biasing spring 218 can urge the first dog 180 away from the second cam 214.

The second biasing spring 218 is configured to permit full rotation of the first cam 212 relative to the second cam 214 (i.e., rotation of the first cam 212 relative to the second cam 214 in a direction and amount that permits the first face gear teeth 200 to fully engage the second face gear teeth 206 (FIG. 3)) when the first face gear teeth 200 are abutted against the second face gear teeth 206 (FIG. 3) and are not otherwise engaged.

Figure 9:
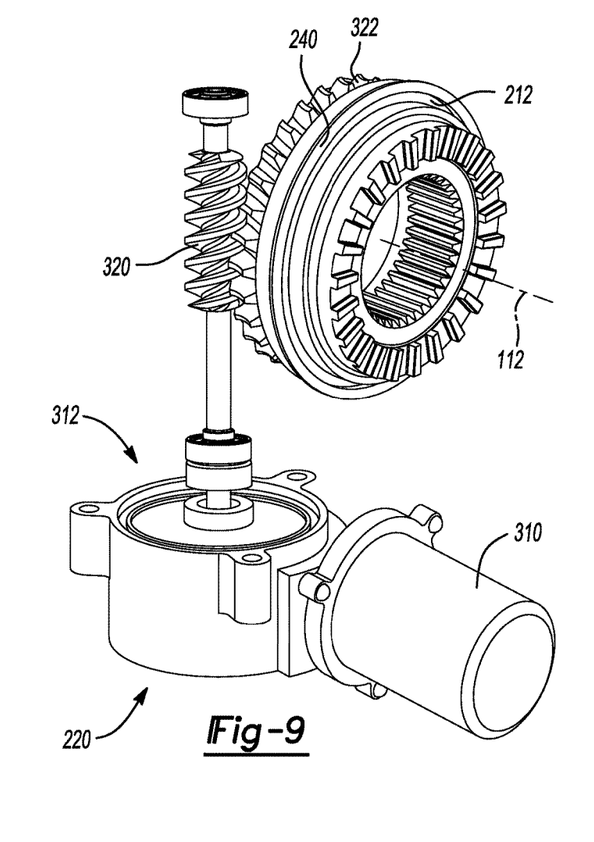
FIG. 9 is a perspective view illustration a portion of the actuation system.

In FIGS. 3 and 9, the drive mechanism 220 can comprise any means for providing a rotational input to the first cam 212 to drive the first cam 212 about the first axis 112. In the particular example provided, the drive mechanism 220 comprises an electric motor 310, and a transmission 312 that is driven by the electric motor 310. The transmission 312 includes a drive worm 320 and a worm gear 322 that is coupled to or formed on the first cam body 240. It will be appreciated that the drive worm 320 and worm gear 322 can be configured to lock so as to resist rotation of the first cam 212 about the first axis 112 relative to the actuator housing 210 and that construction in this manner may obviate any need for the detent members 244 (FIG. 5) and detent recesses 276 (FIG. 5).

The seal 222 can be a rotary seal that can be configured to form a seal between the input spindle 102 and the actuator housing 210. The seal 222 can be received into a counterbore 330 that is formed into a side of the actuator housing 210 that bounds the first cavity 110.

With reference to FIGS. 3 through 5 and 9, the electric motor 310 of the drive mechanism 220 can be operated in a first rotational direction to rotate the first cam 212 about the first axis 112 to align the first peaks 256 on the first cam profile 242 to the second valleys 288 on the second cam profile 274. In this condition, the first biasing spring 216 urges the first cam 212 axially toward the second cam 214, and additionally retracts the first dog 180 from the second dog 182 due to contact between the centering member 280 on the second cam 214 and the external snap ring 300 that is mounted to the first dog 180. In this condition, rotation of the input spindle 102 will cause corresponding rotation of the first dog 180, but no rotary power will be transmitted to the intermediate spindle 104 or the ring gear 106 because the first face gear teeth 200 of the first dog 180 are decoupled from the second face gear teeth 206 of the second dog 182.

The electric motor 310 of the drive mechanism 220 can be operated in a second, opposite rotational direction to rotate the first cam 212 about the first axis 112 to align the first peaks 256 on the first cam profile 242 to the second peaks 290 on the second cam profile 274. In this condition, the first and second valleys 254 and 288 cooperate to urge the second cam 214 axially along the first axis 112. Axial motion of the second cam 214 is communicated through the second biasing spring 218 to the first dog structure 192, which permits the first face gear teeth 200 to shift axially into engagement with the second face gear teeth 206. In this condition, rotary power provided by the input spindle 102 can be transmitted between the first and second dogs 180 and 182 and to the intermediate spindle 104 to drive the ring gear 106 and the pinion 108.

It will be appreciated that construction of the actuator housing 210 in this manner permits various elements of the first clutch 46 to be assembled to the actuator housing 210 and then assembled with the actuator housing 210 (as a unit) to the PTU housing 100 and input spindle 102.

Figure 10:
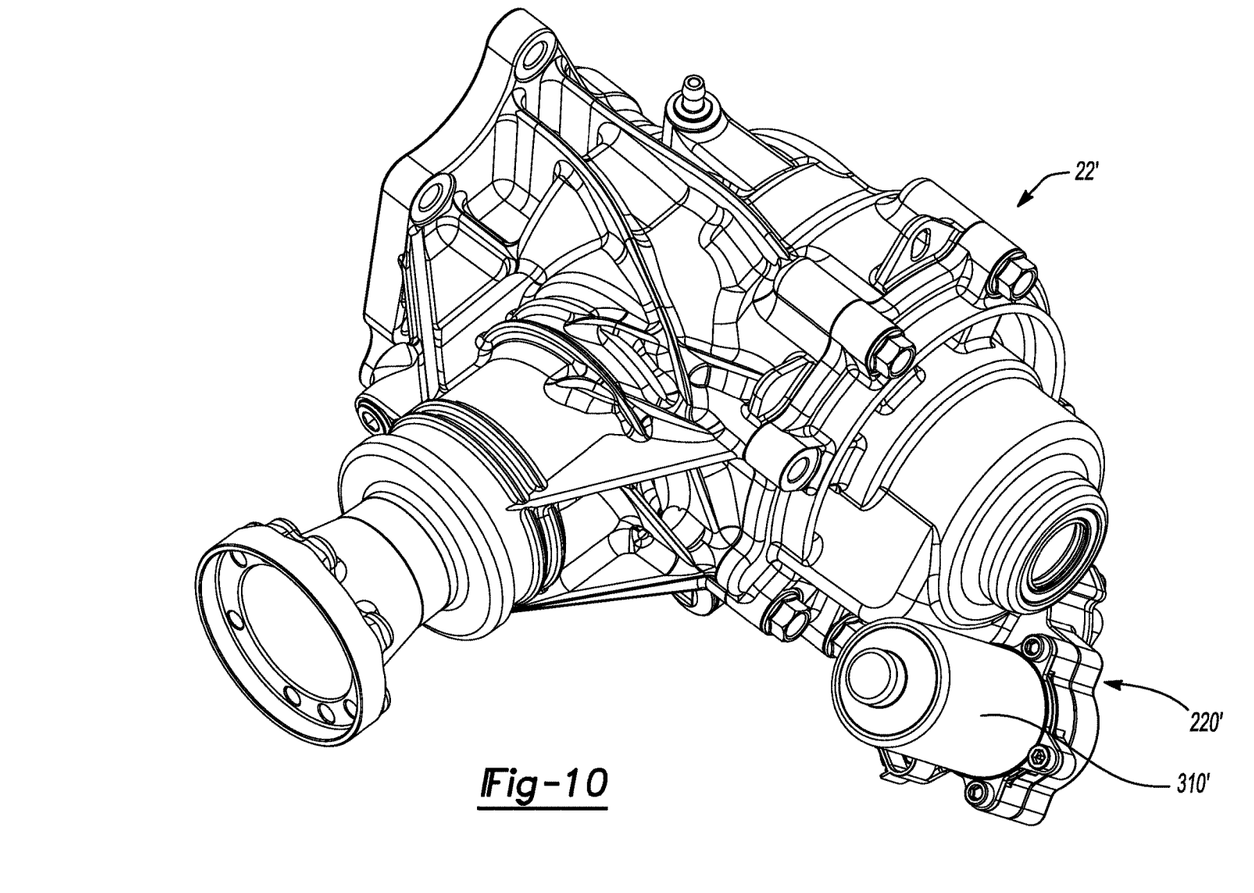
FIG. 10 is a perspective view of a second PTU constructed in accordance with the teachings of the present disclosure.

With reference to FIG. 10 a second PTU constructed in accordance with the teaching of the present disclosure is identified by reference numeral 22'. Elements of the PTU 22' that are similar to the elements of any of the above-discussed embodiments will employ corresponding reference numerals, but those reference numerals with be marked with a prime (') symbol.

Figures 13, 14:
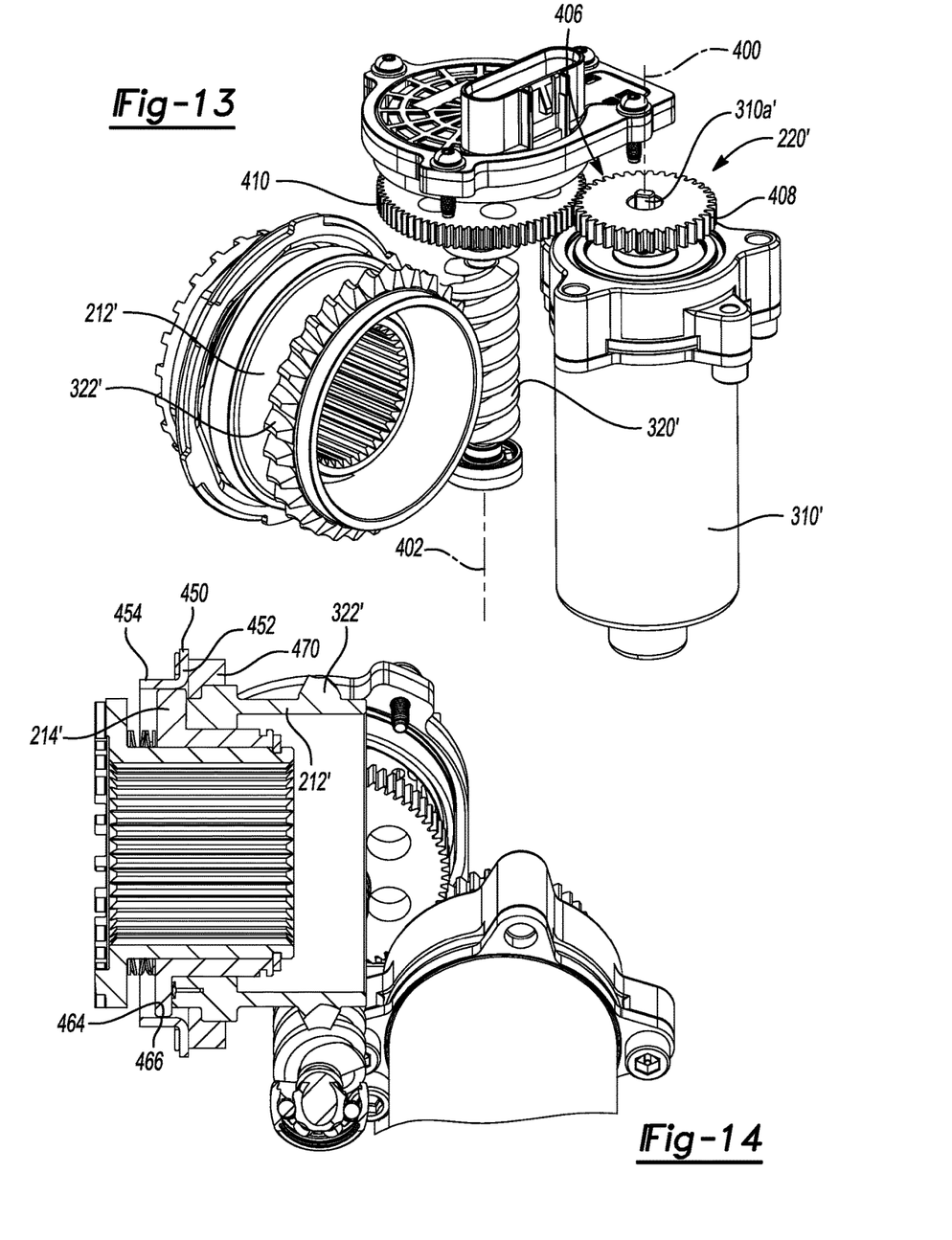
FIG. 13 is a perspective view of a portion of the PTU of FIG. 10, illustrating a drive mechanism in more detail.
FIGS. 14 and 15 are perspective views of portions of the PTU of FIG. 10, illustrating a portion of an actuator in more detail.
Figure 15:
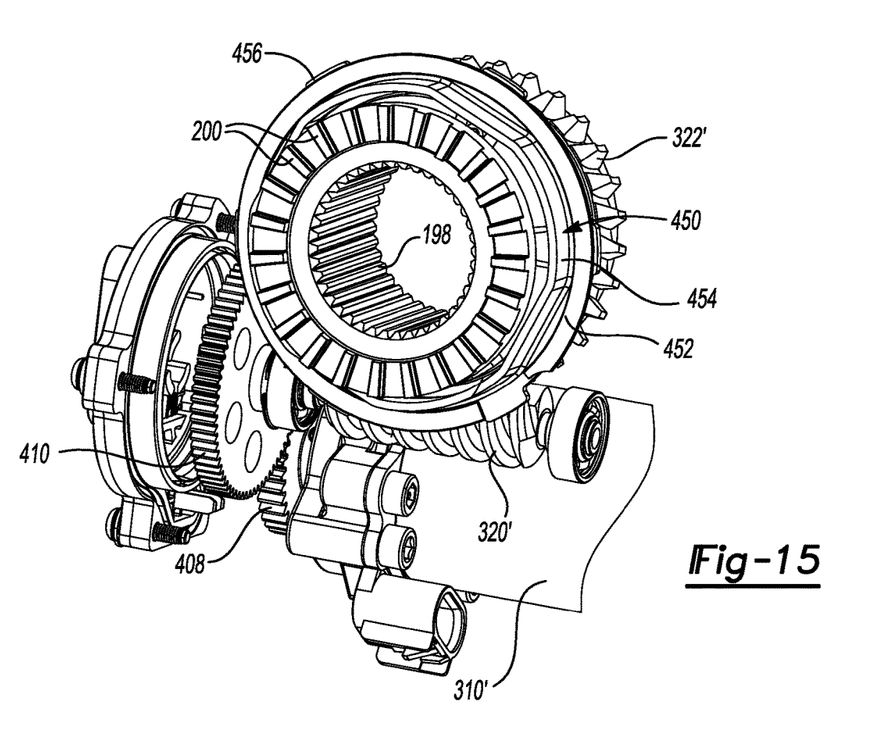

In FIGS. 10 and 13, the drive mechanism 220' can be configured such that the electric motor 310' is disposed along a first axis 400 and the drive worm 320' is disposed along a second axis 402 that can be parallel to the first axis 400. The electric motor 310' can be employed to drive a spur gear arrangement 406 that transmits rotary power between the electric motor 310' and the drive worm 320'. In the particular example provided, the spur gear arrangement 406 includes a first gear 408, which is mounted to an output shaft 310a' of the electric motor 310', and a second gear 410 that is meshingly engaged to the first gear 408 and fixedly coupled to the drive worm 320'. Similar to the above-described example, the drive worm 320' is employed to provide rotary power to a worm gear 322' that is coupled to or formed on the first cam 212'.

Figure 11:
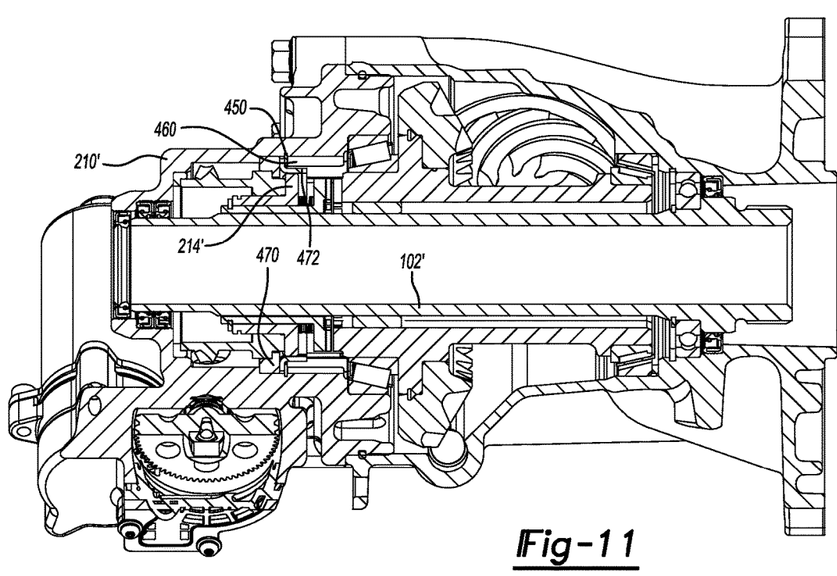
FIG. 11 is a sectional view taken along a longitudinal axis of an input spindle of the PTU of FIG. 10.
Figure 12:
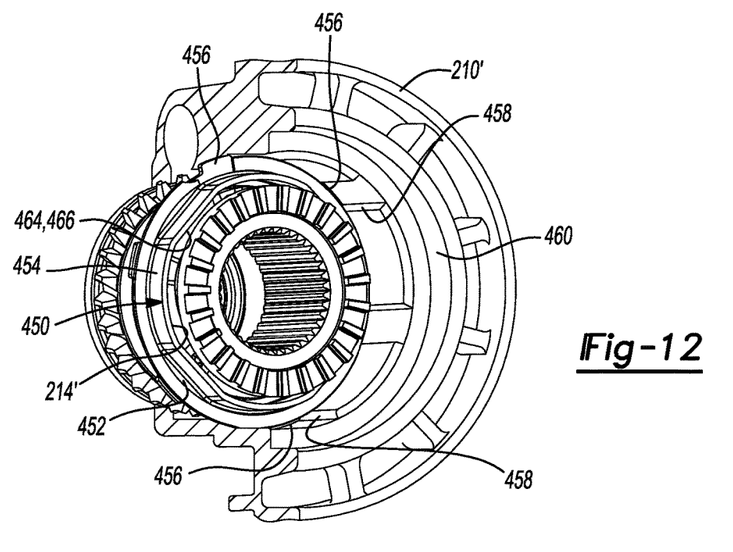
FIG. 12 is a perspective view of a portion of the PTU of FIG. 10 illustrating the connection between a bushing and an actuator housing.

In FIGS. 11, 12 and 14, a bushing 450 is employed to non-rotatably but axially slidably couple the second cam 214' to the actuator housing 210'. The busing 450 can be a stamping or powdered metal component that can have a flange member 452 and an annular body 454 that can extend perpendicular to the flange member 452. The flange member 452 can define a plurality of external grounding features, such as a plurality of tabs 456 that are disposed about the circumference of the flange member 452 and which engage corresponding tab recesses 458 that are formed in a bore 460 formed in the actuator housing 210'. The annular body 452 can define a plurality of e internal grounding features, such as a series of flats 464 that are spaced about the circumference the annular body 452. The flats 464 can engage corresponding flats 466 that are formed on the second cam 214'. A thrust bushing 470 can be disposed between the actuator housing 210' and the first cam 212'. The thrust bushing 470 can be shaped to matingly engage the bore 460 in the actuator housing 210' so that the thrust bushing 470 does not rotate relative to the actuator housing 210'. The flange member 452 of the bushing 450 can be received between the thrust bushing 470 and a retaining ring 472 that can be fitted into a groove (not specifically shown) that is formed in the actuator housing 210'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
an actuator having an actuator housing, a motor, a transmission, a first cam, a second cam, and a first biasing spring, the motor being coupled to the actuator housing and including a motor output member, the transmission having a transmission input member, which is driven by the motor output member, and a transmission output member, the first cam being housed in the actuator housing and coupled to the transmission output member for rotation therewith, the first cam having a first set of cam features that are disposed about a first annular surface, the second cam having a cam body, which is received in the first cam, and a second set of cam features that are disposed about a second annular surface, the second set of cam features abutting the first set of cam features, wherein rotation of the first cam relative to the second cam into a first position orients the first set of cam features onto the second set of cam features so as to position the second cam in an extended position relative to the first cam, and wherein rotation of the first cam relative to the second cam into a second position orients the first set of cam features onto the second set of cam features so as to position the second cam in a retracted position relative to the first cam, the first biasing spring being disposed between the first and second cams and biasing the second cam toward the retracted position; and
a rotary coupling having a first coupling member, a second coupling member and a second biasing spring, the first coupling member being rotatably and axially slidably received in the second cam, the first coupling member being axially movable between a first coupling position, in which the first coupling member is decoupled from the second coupling member, and a second coupling position in which the first coupling member is coupled to the second coupling member to permit the transmission of rotary power through the rotary coupling, the second biasing spring being disposed between the first coupling member and the second cam.

2. The vehicle driveline component of claim 1, wherein the transmission output member comprises a worm gear.

3. The vehicle driveline component of claim 2, wherein the transmission further comprises a drive worm that is meshingly engaged with the worm gear.

4. The vehicle driveline component of claim 1, wherein the rotary coupling comprises a dog clutch.

5. The vehicle driveline component of claim 1, further comprising a hollow spindle and a ring gear, wherein the second coupling member is coupled for rotation with the hollow spindle and the ring gear.

6. The vehicle driveline component of claim 5, further comprising a hollow shaft that extends through the first coupling member and the second cam, the first coupling member being non-rotationally but axially slidably coupled to the hollow shaft.

7. The vehicle driveline component of claim 1, further comprising a plurality of detent members that are coupled to one of the first and second cams and are engagable with recesses formed in the other one of the first and second cams when the first cam is in at least one of the first and second positions.

* * * * *